(12) United States Patent
Dautrey

(10) Patent No.: US 7,833,461 B2
(45) Date of Patent: Nov. 16, 2010

(54) PROCESS FOR MOLDING NOISE-ATTENUATING PROTUBERANCES ON AN INTERNAL SURFACE OF A TIRE

(75) Inventor: Nicolas Dautrey, Gunma (JP)

(73) Assignee: Michelin Recherche et Technique S.A., Granges-Paccot (CH)

(*) Notice: Subject to any disclaimer, the term of this patent is extended or adjusted under 35 U.S.C. 154(b) by 204 days.

(21) Appl. No.: 11/979,348

(22) Filed: Nov. 1, 2007

(65) Prior Publication Data

US 2008/0116612 A1 May 22, 2008

(30) Foreign Application Priority Data

Nov. 2, 2006 (FR) .................... 06 09644

(51) Int. Cl.
*B29C 35/00* (2006.01)
*B29C 43/10* (2006.01)
*B29D 30/00* (2006.01)
*B60C 99/00* (2006.01)

(52) U.S. Cl. .................. 264/326; 264/328.3; 264/501; 425/37; 425/43; 425/52; 425/54

(58) Field of Classification Search .............. 425/49, 425/37, 54, 43, 52; 264/501, 326, 328.3
See application file for complete search history.

(56) References Cited

U.S. PATENT DOCUMENTS 3,170,195 A * 2/1965 Knox .................... 425/49
3,822,857 A * 7/1974 Tanie .................... 249/141
4,399,851 A    8/1983 Bschorr
4,715,801 A * 12/1987 Montierth .................. 425/110
5,531,582 A *  7/1996 Klinkhammer ............. 425/190
6,343,843 B1   2/2002 Nishikawa

FOREIGN PATENT DOCUMENTS

DE      196 19 859      11/1997
JP      2006/117115     5/2006

OTHER PUBLICATIONS

"Tetrafluoroethylene Copolymers (Overview)", Teruo Takakura, Polymeric Materials Encyclopedia, accessed via http://www.polymersnetbase.com/pme/article_print.asp?id=11042&hits= on Jan. 4, 2010.*

* cited by examiner

Primary Examiner—Philip C Tucker
Assistant Examiner—Alison Hindenlang
(74) Attorney, Agent, or Firm—Buchanan Ingersoll & Rooney PC

(57) ABSTRACT

Process for molding and vulcanizing a tire, in which a tire blank is placed in a curing press including a mold intended to form the outer shape of the tire, and a pressing member for transmitting the molding pressure and the heat needed to vulcanize the internal portion of the tire blank. A removable elastic membrane, which includes perforations passing completely therethrough, is interposed, during the molding and the vulcanizing step, between the inner surface of the tire and the pressing member, so as to form, by the constituent material of the internal wall of the tire flowing into the perforations, noise-attenuating protuberances distributed over the internal surface of the tire.

15 Claims, 2 Drawing Sheets

PROCESS FOR MOLDING NOISE-ATTENUATING PROTUBERANCES ON AN INTERNAL SURFACE OF A TIRE

The present application claims priority under 35 U.S.C. §119 to Patent Application No. 06/09644 filed in France on Nov. 2, 2006, the content of which is incorporated by reference.

BACKGROUND OF THE INVENTION

The invention relates to the manufacture of tires and more precisely to a molding process and to a molding device.

Many ways have been developed for attenuating the noise generated by tires during running. This noise is mainly generated by contact between the tread and the ground, but also by the vibration of the air inside the tire. This particular noise is also called "cavity noise".

To reduce cavity noise, novel solutions have been proposed such as the use of foam, the fitting of resonators of the Helmholtz resonator type, or the provision of obstacles to the propagation of soundwaves on the internal surface of the tire.

These obstacles may consist of a multitude of elements oriented in the radial direction, which takes the form of elongate protuberances, of small size and small cross sections, and which may have a tapered end.

These elements may be fastened to the inner wall, or just simply molded during the step of molding and vulcanizing the tire.

A tire of this type has been described, for example in the Japanese Publication 2006-117115. This publication also discloses a manufacturing process for producing this type of tire.

This process consists in molding the protuberances during the operation of vulcanizing the tire. For this purpose, a rigid core is introduced into the internal space of the tire blank in such a way that said core occupies the entire internal space for the purpose of transmitting, by contact with the internal wall, the pressure and the heat needed for molding and vulcanizing. This core comprises perforations of small cross section opening radially into circumferential ducts intended for removing the air.

Upon introducing the core and the tire blank into the mold, the pressure exerted by the core on the constituent material of the internal wall of the tire causes said material to be transferred by flowing into the perforations made in the rigid core. The occluded air is removed via the circumferential ducts. Vulcanization of the tire takes place at the same time as the vulcanization of the protuberances, which thus take the form of perforations made in the core.

However, the implementation of this process and the use of the device that are described in this publication require equipment specific to the use of rigid cores and a curing press suitable for accommodating this type of core.

SUMMARY OF PREFERRED EMBODIMENT

The object of the invention is to propose a process and means that are capable of being used in standard curing presses, such as curing presses comprising a mold intended to confer the external impression on the tire and a flexible membrane for transferring the molding pressure and the heat needed to vulcanize the internal portion of the tire blank.

This process is characterized in that an elastic removable membrane, which includes perforations of given shape and cross section passing right through said membrane, is interposed between the inner surface of the tire and the curing membrane.

This makes it possible to form, by the constituent material of the internal wall of the tire flowing into the perforations, protuberances distributed over the internal surface of the tire.

It should be observed that, although the process according to the invention is particularly suitable for being implemented in a conventional vulcanizing process that includes a curing membrane, it is entirely possible to use a perforated membrane of the type described above in a curing/vulcanizing process of the type with a rigid internal core such as that described in the publication JP-2006-117115.

A person skilled in the art is able to appreciate that the shape and the arrangement of the protuberances on the internal wall of the tire are directly related to the shape and the arrangement of the perforations made in the perforated membrane.

Because of its elastic properties, the perforated membrane conforms to the shape of the internal portion of the tire blank, in particular during the in-press shaping phase when the tire blank is pushed radially towards the bottom of the tread patterns made in the mold.

The shape of the membrane must be adapted so as to match the internal surface of the tire on which it is desired to form protuberances. However, as will be seen later, this shape may be relatively simplified if the protuberances are placed on the sole portion of the crown region.

After the vulcanizing operation, the perforated membrane is detached from the internal portion of the tire and may be reused for producing another tire of the same type.

BRIEF DESCRIPTION OF THE DRAWINGS

A preferred method of implementing the invention will be described below with reference to FIGS. 1 to 5, in which.

DESCRIPTION OF A PREFERRED EMBODIMENT OF THE INVENTION

Figure 1:
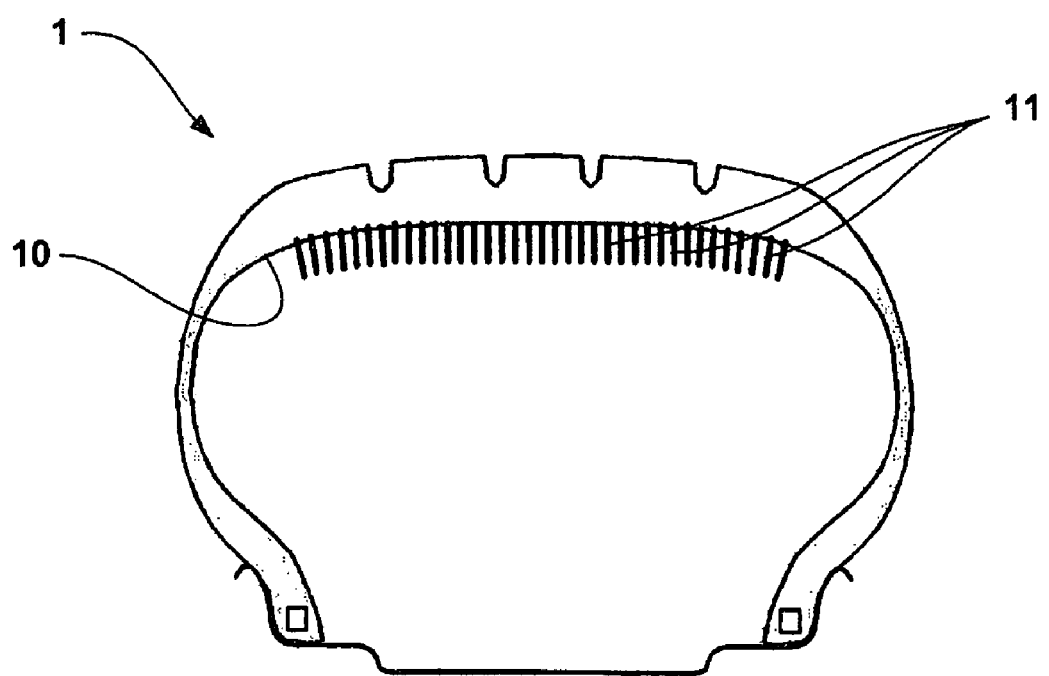
FIG. 1 shows a schematic sectional view of a tire that includes attenuators of the type of those obtained by the process according to the invention.

The tire 1 shown in FIG. 1 includes, on the internal surface of its crown, a number of protuberances 11 of elongate shape and small cross section, the function of which is to attenuate the sound resonance generated by the tire when it is running. These protuberances may be of various shapes. In addition, depending on the nature of the desired attenuation, it is possible to vary the number and the distribution of the protuberances per unit area, or else the diameter d at the base and the height h of the protuberances may be modified, or else a protuberance may be given a particular shape, such as a cylindrical, conical, prismatic, pyramidal, parallelepipedal shape, or a combination of these shapes.

The shape of the perforations, and of the protuberances obtained, shown in the figures for supporting the description, is cylindrical or conical.

Searching for the best compromise is not the subject of the invention, which relates to the molding process, since the desired shape is not a limiting factor as regards the operation of extracting the perforated membrane of the invention. However, shapes having reverse tapers or shapes in which the diameter at the base is very small, or any shape liable to cause tearing of the protuberances during extraction of the perforated membrane after the vulcanizing step, are avoided.

Figure 2:
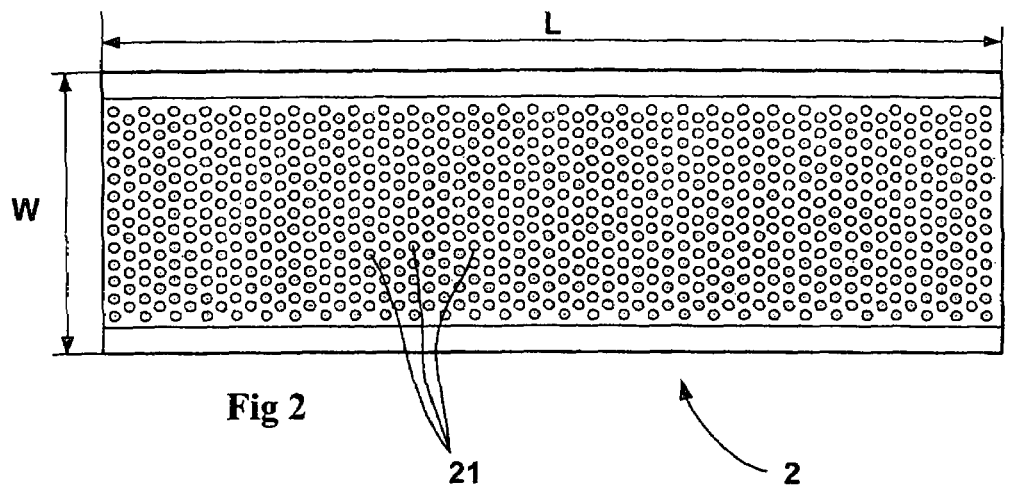
FIG. 2 shows a schematic top view of a perforated membrane capable of implementing the invention.
Figure 3:
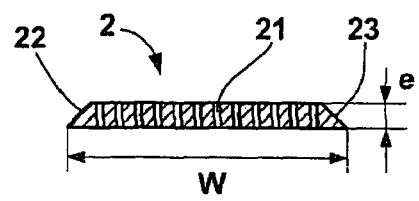
FIG. 3 shows a schematic view of the perforated membrane in cross section.

The protuberances of the tire shown in FIG. 1 are located beneath the crown. Consequently, it is possible to use a perforated membrane (2), such as the one shown in FIGS. 2 and 3, which takes the form of a strip segment, the length L of which correspond approximately to the length of the circumference of the internal portion of the crown of the tire blank (1) and the width W of which corresponds approximately to the width of the crown of the tire blank (1).

When this simplified shape of the perforated membrane no longer proves to be suitable, in other words when it is desired to place the protuberances over the entire inner surface of the tire, the shape of the membrane is then adapted so as to match this inner surface and then takes the form of a portion of a torus.

Figure 4:
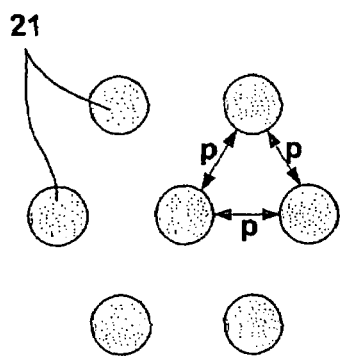
FIG. 4 shows a schematic view of the arrangement of the perforations.

This membrane includes perforations spaced apart with a spacing p (see FIG. 4), the cross section of which perforations, here circular, may be adapted according to the abovementioned requirements. These perforations pass right through the membrane. This is because, during molding, it is important to remove the air expelled by the material forming the protuberances. This air escapes via that side of the perforated membrane lying on the side facing the pressing member, e.g., a curing membrane. Like the techniques commonly practiced in this field, said curing membrane may include drains capable of channelling, and then removing, the occluded air between the inner surface of the tire and the curing membrane in the direction of the beads forming the bottom region of the tire.

The length of the perforated membrane 2 is adjusted so as to correspond quite precisely to the internal development of the tire blank. Particular attention must be paid to this construction so as to prevent the material constituting the inner lining to flow into the line of abutment between the two longitudinal ends of the ring. When this adjustment is satisfactory, it has been observed that the pressure exerted by the curing membrane is sufficient to prevent any longitudinal movement of the perforated membrane at this point and thus to create an opening between the two edges.

To alleviate this difficulty, it is also possible to provide a perforated membrane in which the two longitudinal ends are joined so as to form a closed ring, the development of which is equal to the internal development of the tire blank.

The perforated membrane is introduced into the internal portion of the tire blank before each curing cycle and extracted from the tire after the vulcanization step.

The material used to manufacture the perforated membrane 2 must be a material capable of undergoing a large number of thermal cycles and of withstanding high temperatures, which may range up to 200° C.

In addition, the surface of the perforated membrane must not adhere to the inner surface of the tire nor to the surface of the curing membrane. For this purpose, it may be chosen to produce said perforated membrane in a silicon-based material or else in a rubbery elastomer such as EPDM. In the latter case, it will be necessary to carry out a surface treatment at each use, for example by spraying a non-stick solution such as a silicone-based solution.

It is also important to choose a material having a Shore hardness that is neither too high, so as to avoid serious deformations of the inner profile of the tire, nor too low, to prevent the perforations from deforming under the effect of the pressure of the curing membrane. For this purpose, the material having a Shore A hardness of between 60 and 90, preferably 70, has proved to be very suitable for a membrane with a thickness e of 10 mm, having the perforations with a diameter of 1 mm spaced apart with a spacing of 1 mm.

Of course, it is possible to adapt the process and the device in order to produce perforations arranged in all kinds of geometries, relating to the arrangement, the height or the spacing of the perforations, depending on the shape and the arrangement of the protuberances that it is desired to obtain.

The perforated membrane may include, along its two longitudinal sides, chamfers (22, 23) with a suitable slope and width, so as to favour molding of the edges and to prevent the deleterious effects that could cause too great a step to be formed.

Figure 5:
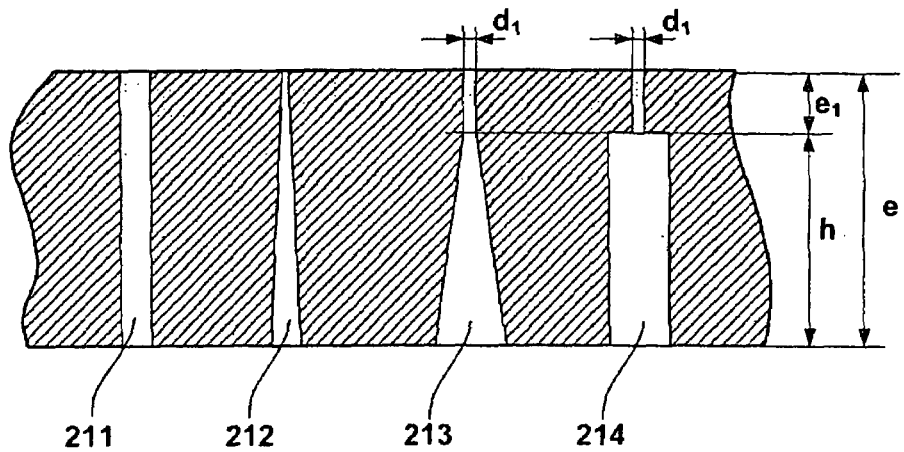
FIG. 5 shows a schematic view of the perforations in cross section.

As a general rule, the height h of the protuberances corresponds to the thickness e of the perforated membrane when the cross section of the base of the protuberance is relatively small, as shown by the references 211 and 212 in FIG. 5. The term "small cross section" is understood to mean a cross section of about 2 mm$^2$ or less.

However, when it is desired to produce protuberances having a larger cross section at the base, it then proves to be necessary to modify the shape of the perforations. This is because it is essential to prevent the material constituting the lower surface of the tire from flowing beyond the perforated membrane into the space lying between the perforated membrane and the curing membrane.

In this case, it is necessary to choose a perforated membrane with a thickness e greater than the height of the protuberance, to produce a perforation having a cross section corresponding to the desired shape and cross section of the protuberances, of height h, and then to produce a complementary perforation of very small cross section and of height $e_1$, such that the sum of the height h and of the height $e_1$ is equal to the thickness e, so as to form a duct for removing the occluded air on that side of the perforated membrane in contact with the curing membrane. The term "very small cross section" is understood to mean a cross section of less than 0.5 mm$^2$. Such perforations are shown by the references 213 and 214 in FIG. 5.

Finally, it is important to point out that the curing times and temperatures must be adjusted accordingly, owing to the presence of the perforated membrane.

Thus, the process according to the invention, based on the use of an elastic perforated membrane, which is generally flexible and removable, is able to produce a tire having protuberances in a simple manner, by implementing a conventional vulcanization process, without it being necessary to incur expensive investment costs.

The invention claimed is:

1. In a process for molding and vulcanizing a tire, in which a pre-formed tire blank is placed in a curing press comprising a mold configured to form the outer shape of the tire, and a pressing member for transmitting molding pressure and heat to vulcanize an internal portion of said tire blank, the improvement wherein a removable elastic membrane is interposed between the tire blank and the pressing member such that a first face of the membrane engages the tire blank, and an opposite second face of the membrane engages the pressing member, the membrane being of one-piece construction from the first face to the second face and having perforations passing completely therethrough from the first face to the second face, wherein during a tire molding and vulcanizing step, the membrane transmits the heat and the molding pressure to the tire blank and conforms to the shape of the internal portion of the tire blank, to cause constituent material of the internal surface of the blank to flow into the perforations to form noise-attenuating protuberances distributed over and integral with the internal surface of the tire.

2. In the process according to claim 1, wherein the pressing member comprises a rigid core for applying a rigid pressing force to the membrane.

3. In the process according to claim 1, wherein the pressing member comprises an elastic membrane applying an elastic force to the membrane.

4. In the process according to claim 1, including detaching the perforated membrane from the internal surface of the tire after the vulcanization step.

5. In the process according to claim 1, wherein the perforated membrane is placed on the internal surface of the tire blank before said tire blank is introduced into the curing press.

6. In the process according to claim 5, wherein the perforated membrane has the shape of a torus matching the shape of the internal surface of the tire blank and conforms to the shape of the internal surface of the blank when pressed thereagainst.

7. In the process according to claim 5, wherein the perforated membrane has the form of a strip segment, a length L of which segment corresponds approximately to the length of the circumference of an internal portion of a crown of the tire blank, and a width W of which corresponds approximately to a width of the crown of the tire blank, wherein the strip segment conforms to the shape of the internal portion of the crown when pressed thereagainst.

8. In the process according to claim 7, wherein the perforated membrane comprises an endless ring which conforms to the shape of the internal surface of the blank when pressed thereagainst.

9. In the process according to claim 1, wherein longitudinal edges of the perforated membrane are chamfered to produce a correspondingly chamfered portion on the internal surface of the tire.

10. In the process according to claim 1, wherein the perforations in the membrane have a shape comprising one of: cylindrical conical, prismatic, parallelepipedal or pyramidal to produce protuberances of corresponding shape.

11. In the process according to claim 1, wherein the protuberances are formed with a height approximately equal to a thickness e of the perforated membrane.

12. Process according to claim 1, in which the protuberances are formed with a height projecting from the tire's internal surface which is less than a thickness e of the perforated membrane.

13. In the process according to claim 12, wherein each of the perforations in the membrane is formed with a first portion, of height h, the cross section of the first portion corresponding approximately to a cross section of the protuberance, and a second portion, of height $e_f$, such that the sum of the height h and the height $e_1$ is equal to a thickness of the membrane, and wherein the cross section of the second portion has an area less than 0.5 mm$^2$.

14. In the process according to claim 1, wherein the interposing step comprises interposing, between the blank's internal surface and the pressing member, a perforated membrane which comprises a silicone-based material having a Shore A hardness of between 60 and 90.

15. In the process according to claim 1, wherein the interposing step comprises interposing, between the blank's internal surface and the pressing member, a perforated membrane which is reusable and which comprises a material based on a rubbery elastomer-coated with a silicone-based solution.

* * * * *